(12) United States Patent
Bishop et al.

(10) Patent No.: US 11,106,798 B2
(45) Date of Patent: Aug. 31, 2021

(54) AUTOMATICALLY REPLACING VERSIONS OF A KEY DATABASE FOR SECURE BOOTS

(71) Applicant: HEWLETT PACKARD ENTERPRISE DEVELOPMENT LP, Houston, TX (US)

(72) Inventors: Travis D. Bishop, Houston, TX (US); Kevin G. Depew, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 45 days.

(21) Appl. No.: 16/774,219

(22) Filed: Jan. 28, 2020

(65) Prior Publication Data

US 2021/0232691 A1   Jul. 29, 2021

(51) Int. Cl.
    *G06F 21/00*   (2013.01)
    *G06F 21/57*   (2013.01)
    (Continued)

(52) U.S. Cl.
    CPC ............ *G06F 21/575* (2013.01); *H04L 9/088* (2013.01); *H04L 9/0891* (2013.01);
    (Continued)

(58) Field of Classification Search
    CPC ........ G06F 21/575; G06F 21/44; G06F 21/57; G06F 21/64; G06F 9/4406;
    (Continued)

(56) References Cited

U.S. PATENT DOCUMENTS 9,292,664 B2   3/2016   Gordon et al.
9,524,390 B2   12/2016   Kulkarni et al.
(Continued)

FOREIGN PATENT DOCUMENTS

WO   WO-2017139161   8/2017

OTHER PUBLICATIONS

UEFI Forum, Inc.; "Unified Extensible Firmware Interface (UEFI) Specification"; UEFI Specification, Version 2.8; Mar. 2019; pp. 1698 to 1730; 34 pages.
(Continued)

*Primary Examiner* — Yogesh Paliwal
(74) *Attorney, Agent, or Firm* — Trop, Pruner & Hu, P.C.

(57) ABSTRACT

A technique includes, in a first phase of a secure boot of a computer system, executing boot code of the computer system to access a first version of a secure boot key database to authenticate driver code. The first version of the secure boot key database stores a key corresponding to a plurality of drivers. The technique includes executing the boot code to automatically prepare the secure boot key database for a second phase of the secure boot in which operating system bootloader code is executed. Preparing for the second phase includes executing the boot code to automatically replace the first version of the secure boot key database with a second version of the secure boot key database, and the second version of the secure boot key database stores a key, which corresponds to the operating system bootloader code. The technique includes in the second phase of the secure boot, executing the boot code to access the secure boot key database to authenticate the operating system bootloader code.

20 Claims, 6 Drawing Sheets

(51) Int. Cl.
  *H04L 9/08* (2006.01)
  *H04L 9/32* (2006.01)
(52) U.S. Cl.
  CPC .......... *H04L 9/0894* (2013.01); *H04L 9/3236* (2013.01); *G06F 2221/034* (2013.01)
(58) Field of Classification Search
  CPC . G06F 2221/034; H04L 9/088; H04L 9/0891; H04L 9/0894; H04L 9/3236
  See application file for complete search history.

(56) References Cited

U.S. PATENT DOCUMENTS

| | | |
|---|---|---|
| 9,639,700 B2 | 5/2017 | Campbell et al. |
| 9,881,158 B2 | 1/2018 | Western et al. |
| 2014/0149730 A1* | 5/2014 | Joshi ............... G06F 21/572 713/2 |
| 2016/0070913 A1* | 3/2016 | Kulkarni ............ H04L 63/20 713/2 |
| 2016/0275291 A1* | 9/2016 | Campbell ............ G06F 21/575 |
| 2018/0314831 A1 | 11/2018 | Liu et al. |

OTHER PUBLICATIONS

Vincent Zimmer et al., "UEFI Secure Boot in Linux," IDF13, Sep. 2013, pp. 1-35, Intel Corporation.

\* cited by examiner

AUTOMATICALLY REPLACING VERSIONS OF A KEY DATABASE FOR SECURE BOOTS

BACKGROUND

When a computer system boots (i.e., the system powers up or is reset), the system executes firmware-stored instructions for purposes of initializing the system for basic operational functions and preparing the system for handoff to an operating system. More specifically, in the boot, the computer system may undergo a power on self test (POST) in which the system checks if the components of the system are functioning properly, and the computer system may enable basic input/output (I/O) to allow certain peripherals (e.g., a keyboard and a monitor) to perform basic tasks. In the boot, the computer system may also execute a program called an "operating system bootloader." The operating system bootloader loads operating system code so that at the conclusion of the boot, control may be handed to the operating system.

DETAILED DESCRIPTION

Figure 1:
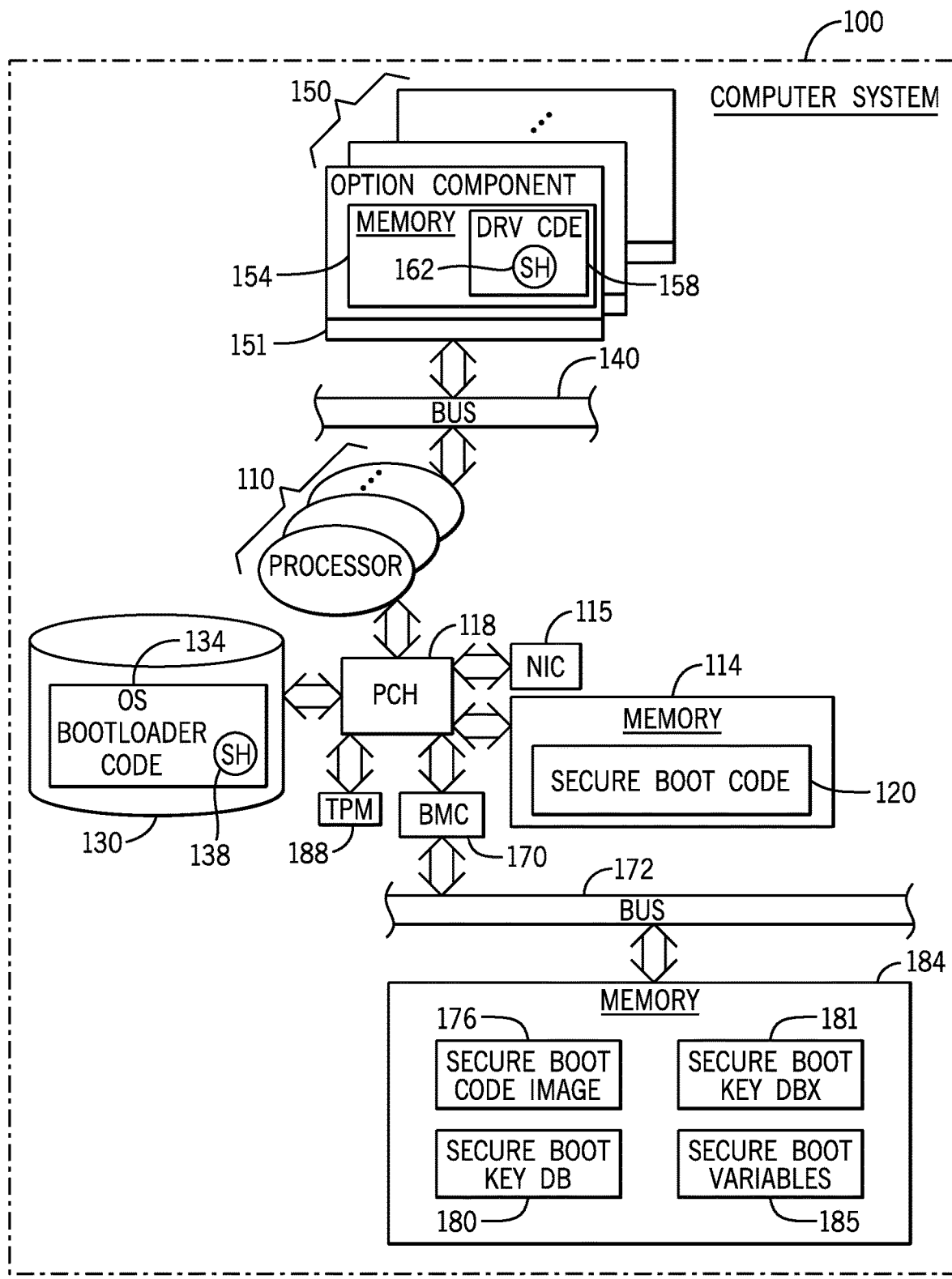
FIG. 1 is a schematic diagram of a computer system according to an example implementation.

If appropriate measures are not undertaken, a computer system may potentially be attacked by malicious software, or malware, in its pre-boot environment. For example, malware otherwise known as a "bootkit" may inject malicious code into the computer system through the operating system bootloader software. As another example, malware otherwise known as a "rootkit" may modify or replace the binary image of the boot code. Either technique may result in malware being loaded through the pre-boot environment, and this malware may not be detectable by either the operating system or by software running on the operating system.

In general, the pre-boot environment of the computer system may be established by the computer system undergoing a boot (or "boot up") when the computer system is reset or powers on. In the boot, the computer system executes firmware to start up the computer system, including configuring components of the computer system, testing components of the computer system and loading program instructions, or code (e.g., option card drivers and operating system bootloader code). In accordance with example implementations that are described herein, the computer system may undergo a secure boot. In this context, a "secure boot" of a computer system refers to the computer system performing operations in response to the reset or power on of the computer system, and these operations include operations to cryptographically validate program instructions, or code, before the computer system allows the code to be executed.

As an example, the secure boot may be a UEFI secure boot, such as the secure boot that is defined in the Unified Extensible Firmware Interface (UEFI) Specification, Version 2.8, UEFI Forum, Inc. (March 2019). The UEFI Specification provides a mechanism to inhibit pre-boot environment attacks, such as bootkit or rootkit attacks, through the use of the secure boot. Although a UEFI secure boot is described herein in example implementations, in accordance with further implementations, the computer system may use a secure boot other than a UEFI Version 2.8 secure boot, and the computer system may use a secure boot than a UEFI secure boot.

The UEFI secure boot establishes a chain of trust for purposes of inhibiting the execution of malware on a computer system. Pursuant to the UEFI secure boot, before program instructions, or code (e.g., option card drivers and operating system bootloader code), is allowed to execute, the computer system checks the code against a permitted secure boot key database and a not permitted secure boot key database. These security checks may rely on a public key infrastructure (PKI) to authenticate the code.

Pursuant to the PKI, public keys are bound to respective identities of entities. In this manner, a given public key is bound to a particular identity, and this public key is part of a public key-private key pair so that the entity holds a private key that corresponds to the public key. More specifically, the entity may be a certificate authority (CA), which may provide a digital key certificate (e.g., an X.509 certificate) that securely associates the entity to a particular public key. The CA may, using its corresponding private key, digitally sign program code (e.g., driver code, operating system bootloader code, and so forth) such that the program code may contain the CA's digital signature. To authenticate code that has been purportedly signed by a CA, the computer system may retrieve the public key that corresponds to the CA from the digital key certificate that corresponds to the CA. The computer system may then use the public key to unlock the digital signature contained in the code and use the unlocked digital signature to determine whether or not the code is trusted, as further described herein.

Pursuant to the UEFI secure boot, the computer system checks code (e.g., driver code and operating system boot loader code) against the permitted key signature database and the not permitted key signature database before the code is allowed to execute on the computer system. The permitted secure boot key database (also called the "secure boot key database" herein) may contain one or multiple digital key certificates that are signed by CAs, and a given unit of code that is to be authenticated during the secure boot may contain a signed hash (i.e., a digital signature) that is purportedly signed by a CA with the CA's private key. The computer system checks the permitted key signature database for a public key that corresponds to the CA. With the public key, the computer system attempts to unlock the signed hash. More specifically, the computer system decrypts the signed hash to derive unsigned hash that the computer system checks against a hash of the code's binary image. If the two hashes are equal, then the code passes the part of the authentication pertaining to the permitted secure boot key database.

The not permitted secure boot key database is a database that is used to store one or multiple digital key certificates for public keys that have been revoked. Therefore, as part of the UEFI secure boot, the computer system accesses the not permitted secure boot key database for purposes of determining whether a given public key has been revoked before finally authenticating the code. If the code is not authenticated, (e.g., the above-described hashes do not match or the public key is in the not permitted secure boot key database), then, the computer system does not allow the code to be executed.

In the following description, the phrases "permitted secure boot key database" and "secure boot key database" are used interchangeably.

Although the above-described secure boot may be acceptable for many computer systems, a higher degree of security than what is provided by the UEFI secure boot may be advantageous for an appliance. In this context, an "appliance" refers to a specialized computer system that is constructed to serve a particular function, or purpose. In this manner, the appliance may be pre-configured for a customer so that the appliance is provided to the customer "turnkey" with minimal or no configuration being performed by the customer before use of the appliance. Example appliances may include management appliances, storage appliances, networking appliances, security appliances, and so forth.

A secure boot key database that contains "standard industry" CA public keys may not provide an adequate level security for an appliance. In this context, "standard industry" public keys correspond to CAs that sign software that is used across platforms that correspond to different original equipment manufacturers (OEMs). For example, an operating system bootloader may be signed by a CA. Although a given CA undertakes measures to prevent access to its private key and undertakes measures to ensure that rogue software or malware is not signed by the CA, due to the large volume of code signed by the CA, it is possible that rogue software, or malware, may nevertheless be inadvertently signed by the CA. For example, a fake company may be created for purposes of deceptively inducing the CA to sign malicious software. As such, even if a computer system, such as an appliance, complies with the UEFI secure boot, the appliance may nevertheless inadvertently authenticate and execute malware, as the public key corresponding to the malware may be present in the permitted secure boot key database (and not present in the not permitted secure boot key database).

In accordance with example implementations, the manufacturer of a computer system may serve as the CA for certain software of the computer system. More particularly, in accordance with example implementations, the computer system may be an appliance, and due to the appliance being a special purpose system that may execute designated software (e.g., a designated operating system and operating system bootloader), a CA that has a higher level of trust may be used to digitally sign this designated software. For example, in accordance with example implementations, the manufacturer of the appliance may designate a specific operating system to be used with the appliance, and the manufacturer (who holds a private key) may serve as the CA that signs certain software images, such as an operating system bootloader image. The corresponding digital key certificate from the manufacturer CA may therefore be stored in the secure boot key database.

It may be challenging to restrict the secure boot key database to be limited to a digital key certificate from the manufacturer CA. For example, the appliance may have connectors that allows optional components to be installed in the appliance. The optional components may store drivers in non-volatile, or firmware, memory. For example, the optional components may include Peripheral Component Interconnect Express (PCIe) cards, and option read only memories (ROMs) of the PCIe cards may store drivers for the PCIe cards. During its boot, the appliance loads and executes the drivers for purposes of initializing the appliance, and execution of these drivers initializes the appliance for the use of the optional components. Due to the large number of available optional components, it may be infeasible for the manufacturer of an appliance to serve as the CA to sign every possible option component driver image.

Allowing the secure boot key database of an appliance to be populated with digital key certificates from CAs other than the manufacturer CA, may, however, lower the security of the appliance. For example, a digital key certificate for operating system bootloader code that should not be executed by the computer system may be added to the permitted secure boot key database, and as a result, the computer system may potentially otherwise authenticate, load and execute the wrong operating system bootloader code (and thus, possibly execute malicious bootloader code).

In accordance with example implementations that are described herein, the permitted secure boot key database is specifically configured for different phases of the secure boot such that different versions of the secure boot key database are used for the different phases. More specifically, during a phase of the secure boot, which is associated with loading code from option components (e.g., PCIe cards), a less restrictive secure boot key database (e.g., a version of the database having one or multiple keys corresponding to CA(s) that are used to sign standard industry drivers for option PCIe cards) is used to authenticate program code; and, during a second phase of the secure boot, which is associated with loading an operating system bootloader, a relatively more restrictive secure boot key database (e.g., a version of the database having only a specific key signed by the manufacturer CA) is used to authenticate the operating system bootloader.

Referring to FIG. 1, as a more specific example, a computer system 100 may include one or multiple connectors that allow optional components (called "option components" herein) to be installed in the computer system 100. For the specific example of FIG. 1, the computer system 100 includes one or multiple option component connectors 151 (e.g., expansion card connectors), which allows various option components 150 (e.g., expansion cards) to be installed in the computer system 100. As a more specific example, in accordance with some implementations, the option component connectors 151 may be PCIe card slot connectors into which PCIe option cards (i.e., option components 150) may be installed in the computer system 100.

As depicted in FIG. 1, in accordance with example implementations, the option components 150 are coupled to a bus 140 (e.g., a PCIe bus) for purposes of communicating with components of the computer system 100, such as one or multiple processors 110 (e.g., one or multiple central processing units (CPUs), one or multiple CPU cores, and so forth).

In accordance with example implementations, the computer system 100 may be a specific purpose computer system, or "appliance." As an example, the computer system 100 may be a storage appliance, a networking appliance, a security appliance, or a management appliance, depending on the particular implementation. Moreover, as examples, the appliance may be a rack mounted unit, a desktop computer, a client, a server, a tablet computer, a laptop computer, and so forth, depending on the particular implementation.

In general, a given option component 150 may contain a memory 154 (e.g., a non-volatile memory, such as flash memory), which stores driver instructions, or code 158, for the option component 150. In accordance with some implementations, the option code 158 may be driver code, which is executed by the computer system 100 during the boot of the system 100 for purposes of configuring the system 100 to use the option component 150. As depicted in FIG. 1, in accordance with example implementations, a signed hash 162 is stored on the option component 150 (e.g., embedded in the driver code 158) and is used, as further described herein, to authenticate the driver code 158 before the driver code 158 is allowed to execute on the computer system 100.

In this context, a "hash," or "hash value," refers to a value that is produced by the application of a cryptographic hash function to an input (e.g., a binary image of a given unit of code) to produce the hash. In this manner, a cryptographic hash function may be applied, or performed, by a processor executing machine-executable instructions ("software") to receive an input and produce an output (the "hash") that corresponds to the input. Any minute change to the input may alter the hash. As examples, the cryptographic hash function may be a signed hash function (SHA), any federal information processing standards (FIPS) approved hash function, any national institute of standards and technology (NIST) approved hash function, or any other cryptographic hash function. Moreover, in accordance with further example implementations, a cryptographic hash function may be a function that is applied, or performed, by a hardware circuit (e.g., an application specific integrated circuit (ASIC), a field programmable gate array (FPGA), and so forth) without executing machine-executable instructions.

As used herein, the "hash" refers to a value that is produced by applying a cryptographic hash function to a binary code image of a particular unit of code. For example, for a driver for a particular option component 150, the hash may be produced by applying a cryptographic hash function to the binary code image of the driver. The hash that is stored on the option component 150 is, in accordance with example implementations, a "signed hash," or a hash that has been signed, or locked, by a CA. In this manner, in accordance with example implementations, the option component 150 may store a signed hash 162 for given driver code 158, and the signed hash 162 should correspond (if the driver code 158 passes authentication) to the hash of the binary image of the driver code 158.

More specifically, in accordance with example implementations, the driver code 158 for a particular option component 150 may be signed by a CA such that the CA uses the CA's private key and a signature algorithm to sign a hash of the binary image to produce the corresponding signed hash 162. In the secure boot of the computer system 100, the computer system 100 may derive a hash by applying the cryptographic hash function to the binary image of the driver code 158. The computer system 100 may then use retrieve the public key for the CA from a permitted secure boot key database 180 (also referred to as the "secure boot key database 180" or the "key database 180" herein) and use the retrieved public key to unlock the signed hash 162 to produce an unsecured hash; and the computer system 100 may then compare the unsecured hash to the hash produced by the application of the cryptographic hash function to the binary image of the driver code 158, for purposes of determining whether these two hashes are the same. If the two hashes agree and the public key has not been revoked (as indicated by the corresponding certificate being in a not permitted secure boot key database 181), then the driver code 158 passes authentication. Otherwise, in accordance with example implementations, if the driver code 158 does not pass the authentication test, then the computer system 100 does not execute the driver code 158.

The computer system 100 may have many different architectures, depending on the particular implementation. For the example implementation that is depicted in FIG. 1, the computer system 100 includes the one or multiple processors 110 and a system memory 114. As depicted in FIG. 1, the system memory 114 contains secure boot code 120, which causes the computer system 100 to perform secure boot key database versioning, as described herein. In general, the secure boot code 120 may be executed by a designated boot processor 110 during a secure boot of the computer system 100.

In accordance with example implementations, the boot code 120 may be stored in a secure memory 184 of the computer system 100. In this manner, in accordance with example implementations, the boot code 120 that executes in the memory 114 may be transferred from the secure memory 184. In accordance with some implementations, the secure memory 184 is a non-volatile memory that is formed from one or multiple non-volatile memory devices that are coupled to a Serial Peripheral Interface (SPI) bus 172 of the computer system 100. For this example implementation, the memory 184 stores a secure boot image 176 (corresponding to the boot code 120) and is coupled through the SPI bus 172 to a baseboard management controller 170 of the computer system 100.

As used herein, a baseboard management controller is a specialized service processor that monitors the physical state of a server or other hardware using sensors and communicates with a management system through a management network. The baseboard management controller may also communicate with applications executing at the operating system level through an input/output controller (IOCTL) interface driver, a representational state transfer (REST) application program interface (API), or some other system software proxy that facilitates communication between the baseboard management controller and applications. The baseboard management controller may have hardware level access to hardware devices located in a server chassis including system memory. The baseboard management controller may be able to directly modify the hardware devices. The baseboard management controller may operate independently of the operating system of the system in which the baseboard management controller is disposed. The baseboard management controller may be located on the motherboard or main circuit board of the server or other device to be monitored. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, executing a high-level operating system or hypervisor on a system.

As depicted in FIG. 1, in accordance with example implementations, the memory 184 may store other data used in the secure boot of the computer system 100. For example, as depicted in FIG. 1, in accordance with some implementations, the memory 184 may store data representing the permitted secure boot key database 180 and not permitted secure boot key database 181. In accordance with further example implementations, the permitted secure boot key database 180 and/or the not permitted secure boot key database 181 may be stored in another memory, such as the memory 114. Moreover, as depicted in FIG. 1, in accordance with some implementations, the memory 184 may store data that represents secure boot variables 185 (e.g., a platform key (PK) and a key exchange key (KEK)) that are used in the secure boot of the computer system 100.

The BMC 170 and processors 110 may communicate through an input/output (I/O) bridge, or peripheral component hub (PCH) 118. As also depicted in FIG. 1, one or multiple boot devices 130 may be coupled to the processors 110 through the PCH 118. In this manner, a particular boot device 130 may store operating system bootloader code 134, which contains a signed hash 138 that corresponds to the operating system boot loader code 134. The PCH 118 establishes communications between the components of the computer system 100 and the system memory 114 as well as other components, such as a network interface card 115, a trusted platform module 188, and so forth. The TPM 188 is an example of a security component of the computer system 100, which has a secure memory that may be used to store secure information (e.g., the secure boot variables 185) in lieu of or in addition to secure information that is stored in the memory 184. Examples of TPMs that may be used are commercially available from INFINEON TECHNOLOGIES® and NUVOTON®. Other examples of security components include a firmware-based security co-processor, such as a TPM implemented in ARM TRUSTZONE® commercially available from ARM LIMITED® out of Cambridge, UK or INTEL® SGX commercially available from INTEL® out of Santa Clara, Calif., which can be, for example, part of the processor 110-1. In accordance with further example implementations, the computer system 100 may contain a security component other than a TPM, such as a hardware security module (HSM), for example.

In general, the secure boot of the computer system 100 relies on the permitted secure boot key database 180 and the not permitted secure boot key database 181 for purposes of authenticating various units of code that are executed during the secure boot of the computer system 100. In accordance with example implementations, as part of the secure boot, the computer system 100 changes the versions of the secure boot key database 180 coinciding with different phases of the secure boot so that a less restrictive (and less trusted) version of the database 180 is used to authenticate standard industry units of code (e.g., driver code 158) and a more restrictive (and more trusted) version of the database 180 is used to authenticate the operating system bootloader code 134.

Moreover, in accordance with some implementations, the secure boot for the computer system 100 is constructed so that there is no user option to disable the secure boot. In other words, in accordance with example implementations, the computer system 100 always boots in the secure boot mode.

Figure 2:
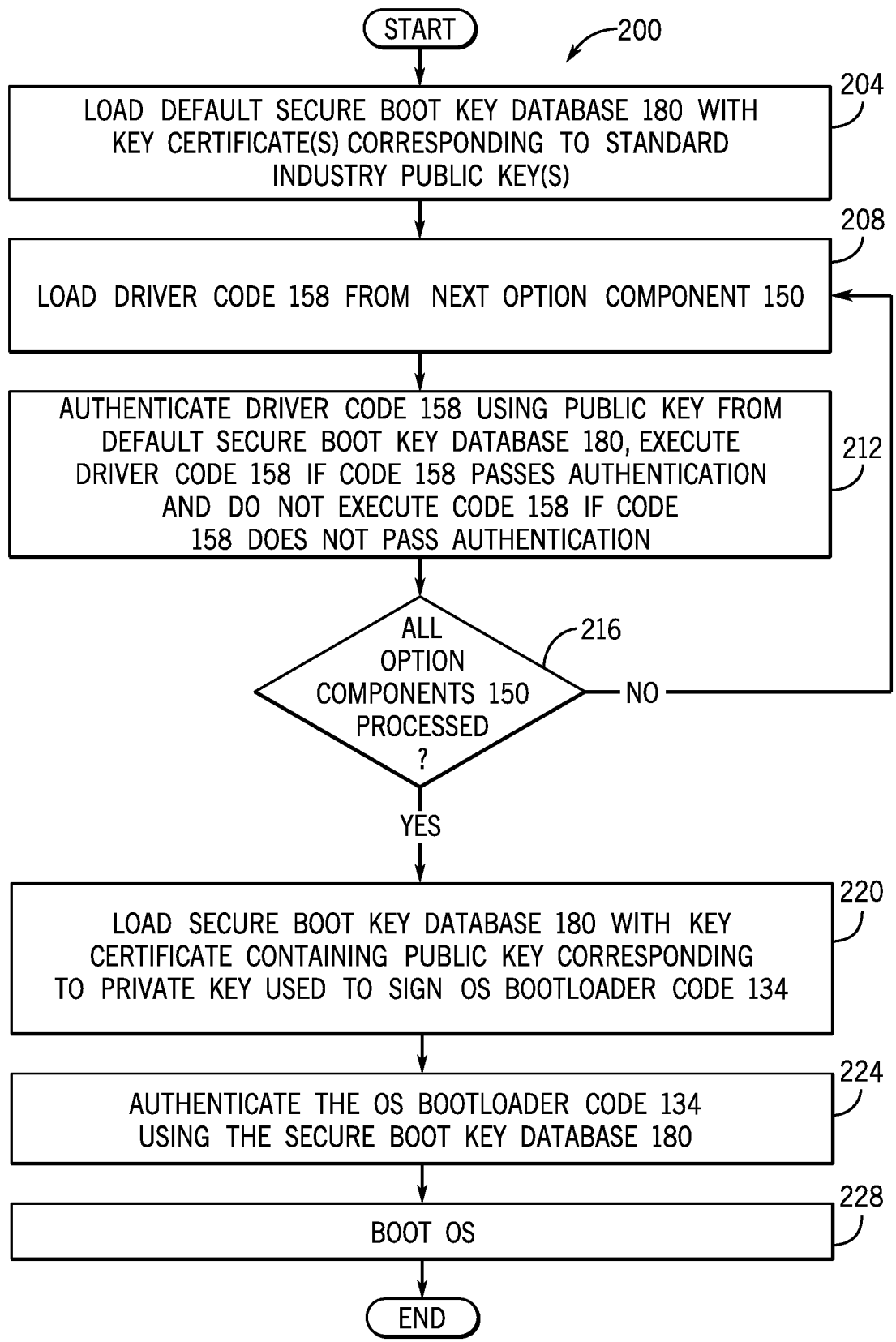
FIG. 2 is a flow diagram depicting certain aspects of a boot process used by the computer system according to an example implementation.

FIG. 2 is a flow diagram illustrating certain aspects of a secure boot process 200 that is used by the computer system 100, in accordance with example implementations. In accordance with some implementations, the process 200 of FIG. 2 may be performed by a designated boot processor 110 of the computer system 100 executing the boot code 120. Referring to FIG. 2 in conjunction with FIG. 1, pursuant to the secure boot process 200, the processor 110 prepares the secure boot key database 180 for a driver execution environment (DXE). The DXE is a phase of the secure boot in which the processor 110 subjects units of code from option components, such as the driver code 158 of the option components 150, to authentication tests; and if the units of code pass the authentication tests, then the processor 110 loads and executes the units of code.

In preparation for the DXE phase, the processor 110 loads (block 204) the secure boot key database 180 with one or multiple digital key certificates (e.g., one or multiple X.509 certificates), which correspond to standard industry public key(s). This version of the secure boot key database 180 is also referred to as the "default secure boot key database 180" or "default key database 180" herein. In accordance with example implementations, the processor 110 loads the secure boot key database 180 with a digital key certificate that corresponds to a public key of a CA and that corresponds to a large number of potential drivers that may be executed by the computer system 100.

In accordance with some implementations, the loading of the secure boot key database 180 with the digital key certificate(s) corresponding to the standard industry public key(s) may be performed in a user mode of the secure boot. In this context, the "user mode" refers to a mode in an UEFI secure boot that is normally associated with a user input option to delete digital key certificates from, modify digital key certificates and/or add digital key certificates to the secure boot key database 180. To be able to perform any of these actions, the user possesses a key exchange key (KEK) and provides the KEK as part of the process of add, delete or modify keys (i.e., the user is not permitted to add, modify or delete a key or key certificate without the KEK). In accordance with example implementations that are described herein, however, the secure process 200 repurposes the user mode of the secure boot so that the user mode is used to load the secure boot key database 180 with one or multiple industry standard public key certificates without actually allowing a user (i.e., any entity outside of the secure boot mode execution) to change the database 180.

After the computer system 100 is prepared for the DXE phase, the secure boot then proceeds to authenticate driver code 158 from the various option components 150; and if these components pass authentication, then allow the code 158 is allowed to execute. More specifically, the processor 110 loads (block 208) the driver code 158 from the next option component 150; and then, pursuant to block 212, the processor 110 authenticates the driver code 158 using a public key in the key database 180 and executes the driver code 158, if the code 158 passes authentication. Otherwise, as depicted in block 212, the driver code 158 is not executed if the code 158 does not pass authentication. Pursuant to decision block 216, if a determination is made that all option components 150 have not been completed, then control returns to block 208. Otherwise, if all option components 150 have been processed, then the DXE phase is complete, and the processor 110 prepares the computer system 100 for a transient system load (TSL) phase, a phase of the secure boot in which the operating system is loaded. It is noted that this assumes that the boot device has been selected.

In accordance with example implementations, in preparation for the TSL phase, the processor 110 loads (block 220) the secure boot key database 180 with a single public key (i.e., loads the database 180 with a single digital key certificate corresponding to the public key) that is associated with the private key that is used to sign the operating system bootloader code 134 that is designated by the OEM of the computer system 100. In this manner, in accordance with example implementations, for this version of the secure boot key database 180, the database 180 contains a single digital key certificate that contains the public key that is associated with the private key that the manufacturer CA (as an example) used to sign the specific operating system bootloader code 134. Next, as depicted in block 224, the processor 110 authenticates the operating system bootloader code 134 using the secure boot key database 180 and then proceeds to boot the operating system, pursuant to block 228. In other words, the computer system 100 proceeds to execute the authenticated operating system bootloader code 134, which loads the operating system and hands off control to the loaded operating system.

Figure 3:
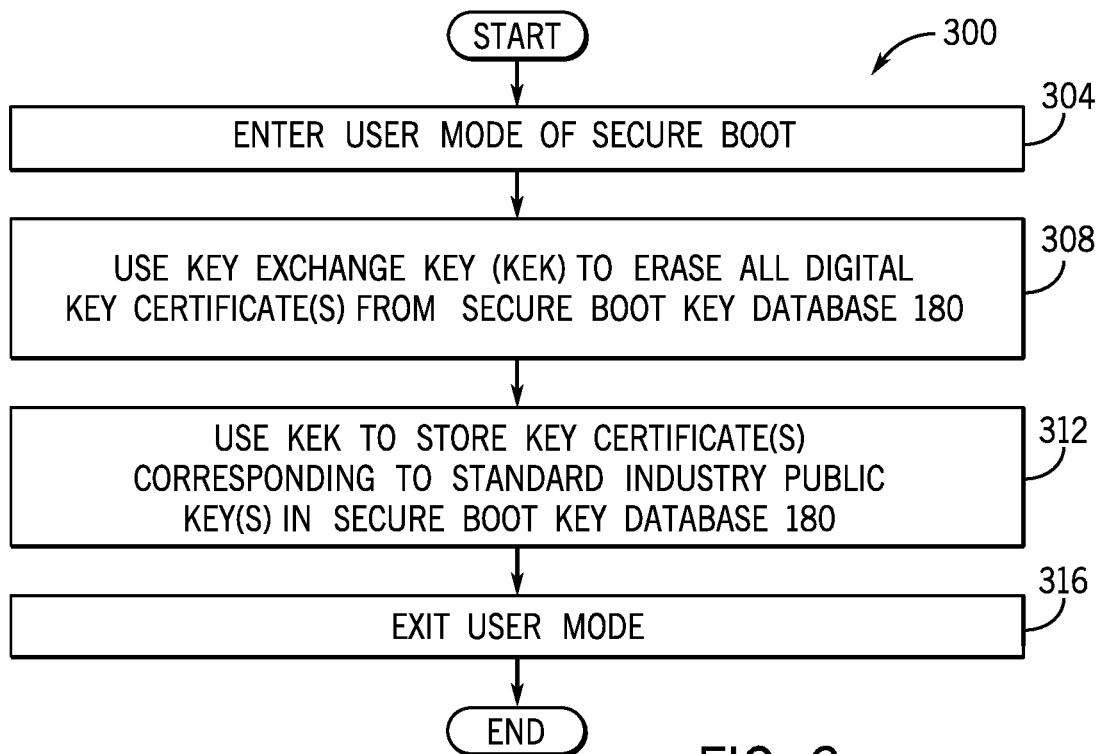
FIG. 3 is a flow diagram depicting a process used by the computer system to set up a secure boot key database corresponding to a first version in which the database stores one or multiple digital key certificates corresponding to standard industry public key(s) according to an example implementation.

FIG. 3 depicts an exemplary process 300 that the computer system 100 uses to, in accordance with example implementations, configure the secure boot key database 180 to correspond to the first default version (i.e., to perform block 204 of FIG. 2). Referring to FIG. 3 in conjunction with FIG. 1, pursuant to the process 300, the processor 110 enters (block 304) the user mode of the secure boot and uses (block 308) the KEK to erase all digital key certificates that are stored in the secure boot key database 180. This erasure may occur in a single operation or may occur by erasing one digital key certificate at a time, depending on the particular implementation. Pursuant to block 312, the processor 110 uses the KEK to store one or multiple digital key certificates (which correspond to standard industry public key(s)) in the secure boot key database 180 and then exits (block 316) the user mode. In accordance with further example implementations, the processor 110 may not erase any digital key certificates but instead may write a set of one or multiple standard industry digital key certificates to the secure boot key database 180.

Figure 4:
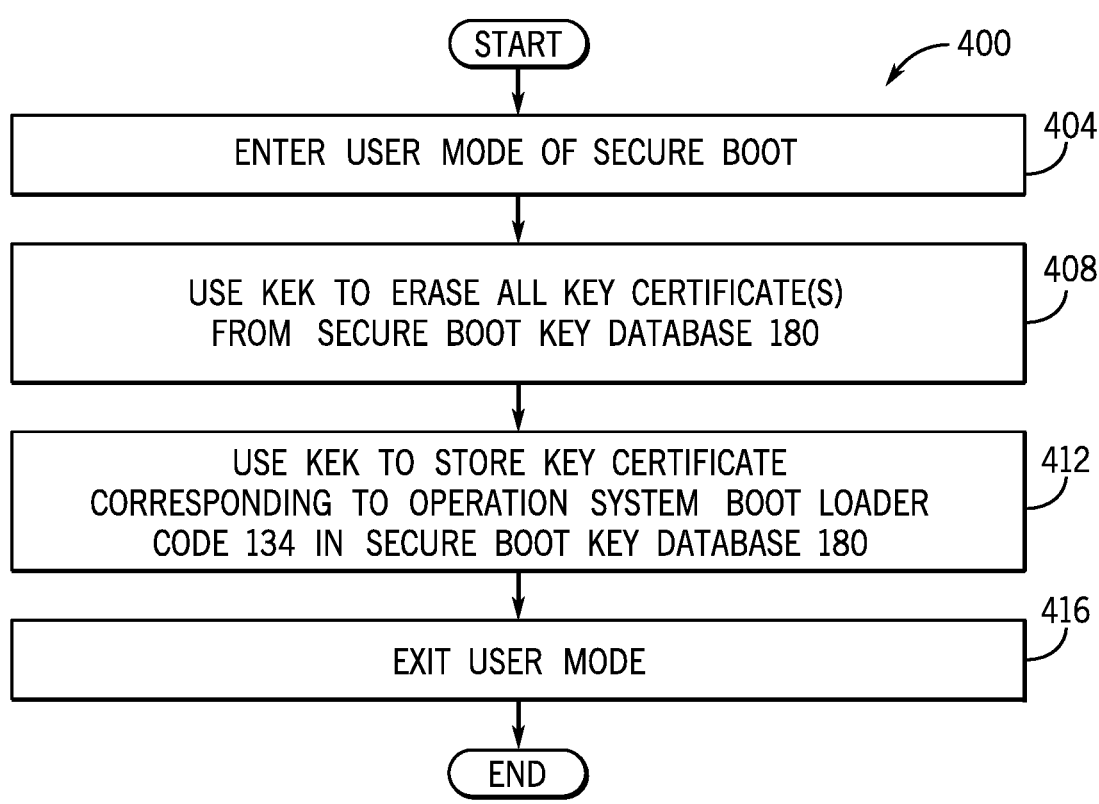
FIG. 4 is a flow diagram depicting a process used by the computer system to set up the secure boot key database to correspond to a second version in which the database stores a digital key certificate for a specific operating system bootloader according to an example implementation.

FIG. 4 depicts an exemplary process 400 that the computer system 100 uses to prepare the secure boot key database 180 for the TSL phase, i.e., configure the secure boot key database 180 to correspond with the second, more restrictive, version. Referring to FIG. 4 in conjunction with FIG. 1, pursuant to the process 400, the processor 110 enters (block 404) the user mode of the secure boot and uses the KEK to erase all digital key certificate(s) from the secure boot key database 180, pursuant to block 408. It is noted that the erasure may be performed by a single instruction or may occur by erasing the digital key certificates (if multiple digital key certificates) one at a time, depending on the particular implementation. Pursuant to block 412, the processor 110 uses the KEK to store a digital key certificate corresponding to the operating system bootloader code 134 in the secure boot key database 180, and then the processor 110 exits the user mode, pursuant to block 416.

Figure 5:
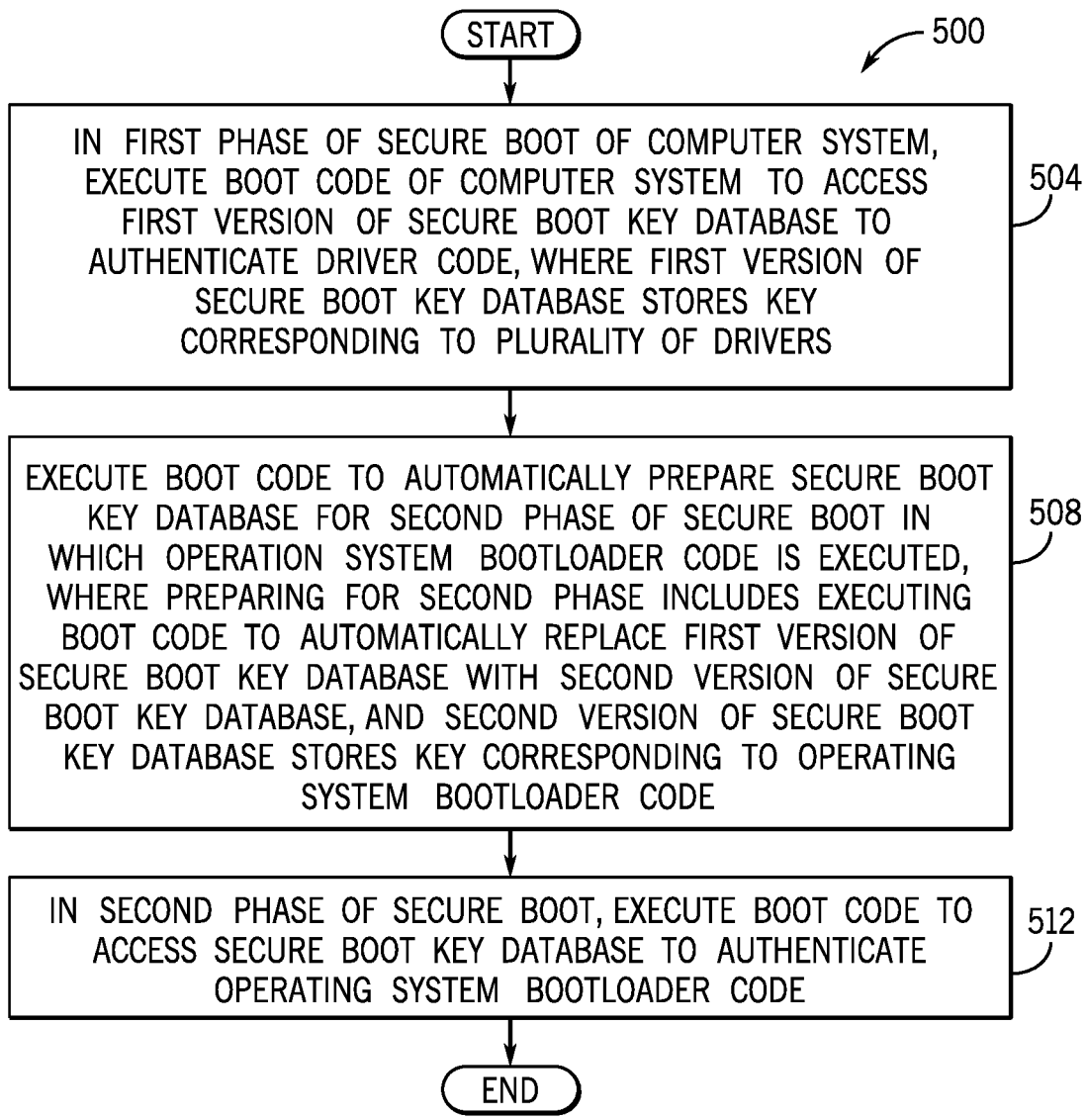
FIG. 5 is a flow diagram depicting a secure boot of a computer system in which a first version of a secure boot key database is replaced with a second version of the secure boot key database according to an example implementation.

Referring to FIG. 5, in accordance with example implementations, a technique 500 includes, in a first phase of a secure boot of a computer system, executing (block 504) boot code of the computer system to access a first version of a secure boot key database to authenticate driver code. The first version of the secure boot key database stores a key corresponding to a plurality of drivers. The technique 500 includes executing (block 508) the boot code to automatically prepare the secure boot key database for a second phase of the secure boot in which operating system bootloader code is executed. Preparing for the second phase includes executing the boot code to automatically replace the first version of the secure boot key database with a second version of the secure boot key database, and the second version of the secure boot key database stores a key, which corresponds to the operating system bootloader code. The technique 500 includes in the second phase of the secure boot, executing (block 512) the boot code to access the secure boot key database to authenticate the operating system bootloader code.

Figure 6:
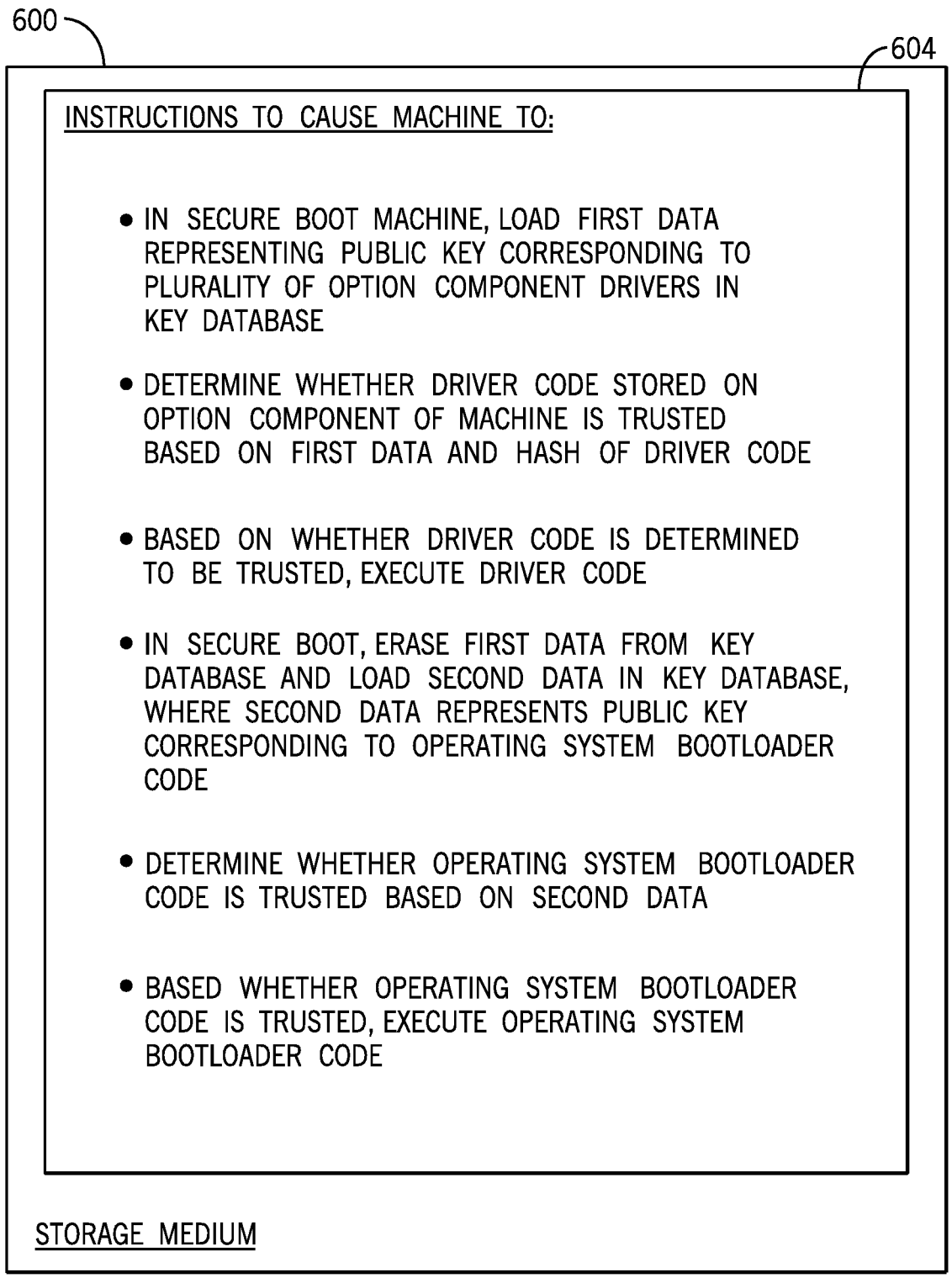
FIG. 6 is an illustration of instructions that are stored on a non-transitory machine-readable storage medium and, when executed by a machine, cause the machine to load and erase public keys from a key database during a secure boot of the machine according to an example implementation.

Referring to FIG. 6, in accordance with example implementations, a non-transitory machine-readable storage medium 600 stores instructions 604 that, when executed by a machine, cause the machine to, in a secure boot of the machine, load first data representing a public key corresponding to a plurality of option component drivers in a key database; determine whether driver code stored on an option component of the machine is trusted based on the first data and a hash of the driver code; and based on whether the driver code is determined to be trusted, execute the driver code. The instructions 604, when executed by the machine, further cause the machine to, in the secure boot, erase the first data from the key database and load second data in the key database. The second data represents a public key that corresponds to an operating system bootloader code. The instructions 604, when executed by the machine, further cause the machine to determine whether operating system bootloader code is trusted based on the second data; and based on whether the operating system bootloader code is determined to be trusted, execute the operating system bootloader code.

Figure 7:
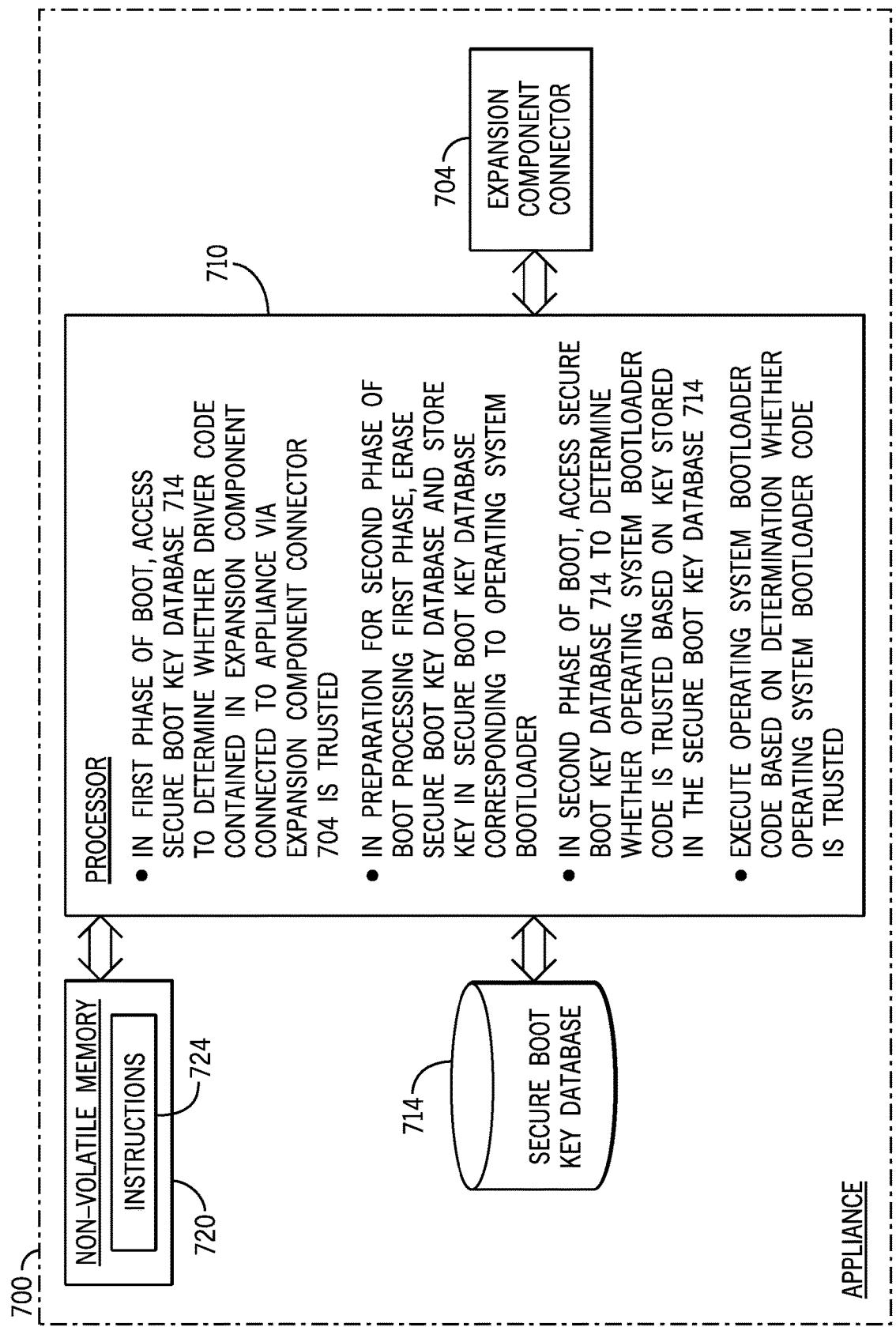
FIG. 7 is a schematic diagram of an appliance that, in preparation for a phase of a boot of the appliance, erases a secure boot key database and stores a key in the secure boot key database corresponding to an operating system bootloader according to an example implementation.

Referring to FIG. 7, in accordance with example implementations, an appliance 700 includes an expansion component connector 704, a processor 710, a secure boot key database 714 and a non-volatile memory 720. The memory 720 stores instructions 724 that, when executed by the processor 710 during boot of the appliance 700, causes the processor 710 to, in a first phase of the boot, access the secure boot key database 714 to determine whether driver code contained in an expansion component connected to the appliance via the expansion component connector 704 is trusted; and in preparation for a second phase of the boot proceeding the first phase, erase the secure boot key database 714 and store a key in the secure boot key database corresponding to an operating system bootloader. The instructions 724, when executed by the processor 710, further cause the processor 710 to, in the second phase of the boot, access the secure boot key database 714 to determine whether operating system bootloader code is trusted based on the key stored in the secure boot key database 714; and execute the operating system bootloader code based on the determination whether the operating system bootloader code is trusted.

In accordance with example implementations, the second version of the secure boot key database has a higher level of trust than the first version of the secure boot key database. A particular advantage of using a version of the secure boot key database with a higher level of trust allows a higher level of security for the secure boot, which may be particularly advantageous for appliances.

In accordance with example implementations, executing the boot code to replace the first version of the secure boot key database with the second version of the secure boot key database includes deleting the key corresponding to the plurality of drivers from the secure boot key database and adding the key corresponding to the operating system bootloader code to the secure boot key database. A particular advantage of deleting the key is that a key corresponding to a less trusted CA is not available to authenticate the operating system bootloader code, thereby providing a secure boot which may be particularly advantageous for appliances.

In accordance with example implementations, executing the boot code to automatically prepare the secure boot key database with the second phase includes automatically transitioning the computer system to a user mode associated with receiving user input and automatically replacing the first version of the secure boot key database with the second version of the secure boot key database without prompting for user input in the user mode. A particular advantage is that the user mode is repurposed for purposes of allowing versions of the secure boot key database to be changed during the secure boot.

In accordance with example implementations, a user option to disable the secure boot is prevented from being provided. A particular advantage is that a more secure boot is provided for the computer system, which may be particularly advantageous for appliances.

In accordance with example implementations, the boot code is executed to prepare the secure boot key database for the first phase of the secure boot, where this preparation includes automatically modifying the secure boot key database to replace the second version of the secure boot key database with the first version of the secure boot key database. A particular advantage of replacing the second version with the first version is that a public key may be provided to accommodate a relatively large number of option components that may be installed in the computer system.

In accordance with example implementations, replacing the first version of the secure boot key database with the second version of the secure boot key database further includes storing a public key in the secure boot key database, where the public key corresponds to a private key used to sign the operating system bootloader code. A particular advantage of storing the public key corresponding to the private key used to sign the operating system bootloader code is that the public key and the operating system bootloader code may be more trusted, which may be particularly advantageous for appliances.

In accordance with example implementations, the key corresponding to the operating system bootloader code includes a public key and is the only key that is stored in the second version of the secure boot key database. A particular advantage is that the public key and the operating system bootloader code may be more trusted, which may be particularly advantageous for appliances.

In accordance with example implementations, the machine may determine a first hash of the driver code based on a binary image of the driver code; access a signed hash of the driver code; determine an unsigned hash based on the signed hash and a given public key represented by the first data; compare the unsigned hash with the first hash; and determine whether the driver code is trusted based at least in part on the comparison. A particular advantage is that cryptographic hash functions may be used to authenticate driver code before the driver code is allowed to execute on the computer system.

In accordance with example implementations, the instructions, when executed by the machine, further cause the machine to determine a first hash of the operating system bootloader code based on a binary image of the operating system bootloader code; access a signed hash of the operating system bootloader code; determine an unsigned hash based on the signed hash and the public key corresponding to the operating system bootloader code; compare the unsigned hash with the first hash; and determine whether the operating system bootloader code is trusted based at least in part on the comparison. A particular advantage is that a cryptographic hash function may be used to determine whether to trust operating system bootloader code before the code is allowed to execute on the computer system.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   in a first phase of a secure boot of a computer system, executing boot code of the computer system to access a first version of a secure boot key database to authenticate driver code, wherein the first version of the secure boot key database stores a key corresponding to a plurality of drivers;
   executing the boot code to automatically prepare the secure boot key database for a second phase of the secure boot in which operating system bootloader code is executed, wherein preparing for the second phase comprises executing the boot code to automatically replace the first version of the secure boot key database with a second version of the secure boot key database, and the second version of the secure boot key database stores a key corresponding to the operating system bootloader code; and
   in the second phase of the secure boot, executing the boot code to access the secure boot key database to authenticate the operating system bootloader code.

2. The method of claim 1, wherein the second version of the secure boot key database has a higher level of trust than the first version of the secure boot key database.

3. The method of claim 1, wherein executing the boot code to replace the first version of the secure boot key database with the second version of the secure boot database comprises:
   deleting the key corresponding to the plurality of drivers from the secure boot key database; and
   adding the key corresponding to the operating system bootloader code to the secure boot key database.

4. The method of claim 1, wherein executing the boot code to automatically prepare the secure boot key database for the second phase comprises automatically transitioning the computer system to a user mode associated with receiving user input and automatically replacing the first version of the secure boot key database with the second version of the secure boot key database without prompting for user input in the user mode.

5. The method of claim 1, further comprising preventing a user option from being provided to disable the secure boot.

6. The method of claim 1, further comprising:
   executing the boot code to prepare the secure boot key database for the first phase of the secure boot up, wherein preparing the secure boot key database for the first phase of the secure boot comprises automatically modifying the secure boot key database to replace the second version of the secure boot key database with the first version of the secure boot key database.

7. The method of claim 1, wherein replacing the first version of the secure boot key database with the second version of the secure boot key database further comprises:
storing a public key in the secure boot key database, wherein the public key corresponds to a private key used to sign the operating system bootloader code.

8. The method of claim 1, wherein the key corresponding to the operating system bootloader code comprises a public key and is the only key stored in the second version of the secure boot key database.

9. A non-transitory machine-readable storage medium to store instructions that, when executed by a machine, cause the machine to:
in a secure boot of the machine, load first data representing a key corresponding to a plurality of option component drivers in a key database;
determine whether driver code stored on an option component of the machine is trusted based on the first data and a hash of the driver code;
based on whether the driver code is determined to be trusted, execute the driver code;
in the secure boot, erase the first data from the key database and load second data in the key database, wherein the second data represents a public key corresponding to an operating system bootloader code;
determine whether operating system bootloader code is trusted based on the second data; and
based on whether the operating system bootloader code is determined to be trusted, execute the operating system bootloader code.

10. The storage medium of claim 9, wherein the public key corresponding to the operating system bootloader code is associated with a first private key having a level of access more restrictive than a level of access of a private key associated with the pubic key corresponding to the plurality of option component drivers.

11. The storage medium of claim 9, wherein the instructions, when executed by the machine, further cause the machine to, in the secure boot, transition the machine to a user mode and automatically erase the first data and load the second data in the user mode without any user input.

12. The storage medium of claim 9, wherein the hash of the driver code comprises a first hash, and the instructions, when executed by the machine, further cause the machine to:
determine the first hash based on a binary image of the driver code;
access a signed hash of the driver code;
determine an unsigned hash based on the signed hash and a given public key of the plurality of public keys represented by the first data;
compare the unsigned hash with the first hash; and
determine whether the driver code is trusted based at least in part on the comparison.

13. The storage medium of claim 9, wherein the instructions, when executed by the machine, further cause the machine to:
determine a first hash of the operating system bootloader code based on a binary image of the operating system bootloader code;
access a signed hash of the operating system bootloader code;
determine an unsigned hash based on the signed hash and the public key corresponding to the operating system bootloader code;
compare the unsigned hash with the first hash; and
determine whether the operating system bootloader code is trusted based at least in part on the comparison.

14. An appliance comprising:
an expansion component connector;
a processor;
a secure boot key database; and
a non-volatile memory to store instructions that, when executed by the processor during boot of the appliance, cause the processor to:
in a first phase of the boot, access the secure boot key database to determine whether driver code contained in an expansion component connected to the appliance via the expansion component connector is trusted;
in preparation for a second phase of the boot proceeding the first phase, erase the secure boot key database and store a key in the secure boot key database corresponding to an operating system bootloader;
in the second phase of the boot, access the secure boot key database to determine whether operating system bootloader code is trusted based on the key stored in the secure boot key database; and
execute the operating system bootloader code based on the determination whether the operating system bootloader code is trusted.

15. The appliance of claim 14, wherein the appliance comprises a management server, an application server or a storage server.

16. The appliance of claim 14, wherein the instructions, when executed by the processor, further cause the processor to:
in preparation for the first phase, load a key corresponding to a plurality of expansion card drivers into the secure boot key database.

17. The appliance of claim 14, wherein the boot comprises a Unified Extensible Firmware Interface (UEFI) secure boot.

18. The appliance of claim 14, wherein the public key stored in the secure boot key database for the first phase of the boot corresponds to a first private key, the key corresponding to the operating system bootloader corresponds to a second private key, and the second private key has a corresponding level of access that is more restrictive than the level of access corresponding to the first private key.

19. The appliance of claim 14, wherein the instructions, when executed by the processor, further cause the processor to erase a key certificate from the secure boot key database in preparation for the second phase of the boot, and the erased key certificate corresponds to a plurality of expansion component drivers.

20. The appliance of claim 14, wherein the instructions, when executed by the processor, further cause the processor to access a signed hash of the driver code, determine an unsigned hash based on the signed hash and a key stored in the secure boot key database, determine a hash based on a binary image of the driver code, and determine whether the driver code is trusted based on whether the unsigned hash is equal to the hash determined based on the binary image of the driver code.

* * * * *